United States Patent
Arvin

(10) Patent No.: US 8,255,814 B2
(45) Date of Patent: Aug. 28, 2012

(54) TEMPORARY TEXT AND GRAPHIC FEEDBACK FOR OBJECT MANIPULATORS

(75) Inventor: Scott Anthony Arvin, New Boston, NH (US)

(73) Assignee: Autodesk, Inc., San Rafael, CA (US)

( * ) Notice: Subject to any disclaimer, the term of this patent is extended or adjusted under 35 U.S.C. 154(b) by 2933 days.

(21) Appl. No.: 10/657,427

(22) Filed: Sep. 8, 2003

(65) Prior Publication Data

US 2004/0056906 A1    Mar. 25, 2004

Related U.S. Application Data

(60) Provisional application No. 60/408,710, filed on Sep. 6, 2002.

(51) Int. Cl.
*G06F 3/00* (2006.01)

(52) U.S. Cl. .................... 715/764; 715/964; 715/735

(58) Field of Classification Search ............ 715/861, 715/764, 964, 735; 716/4
See application file for complete search history.

(56) References Cited

U.S. PATENT DOCUMENTS

| 5,396,590 | A | * | 3/1995 | Kreegar ............ 715/808 |
| 5,845,299 | A | * | 12/1998 | Arora et al. ............ 715/513 |
| 5,861,889 | A | * | 1/1999 | Wallace et al. .......... 345/619 |
| 6,084,598 | A | * | 7/2000 | Chekerylla ............ 345/441 |
| 6,133,925 | A | | 10/2000 | Jaremko et al. |
| 6,948,126 | B2 | * | 9/2005 | Malamud et al. .......... 715/715 |
| 6,959,424 | B1 | * | 10/2005 | Gardner et al. ........... 715/853 |

* cited by examiner

*Primary Examiner* — Simon Ke
(74) *Attorney, Agent, or Firm* — Gates & Cooper LLP

(57) ABSTRACT

A method, apparatus, and article of manufacture provide the ability to temporarily display information relating to an object manipulator. A graphic object is displayed in a computer graphics program. An object manipulator is then displayed on the graphic object. Cursor input where a cursor is placed over the object manipulator is received. In response to the cursor input, information relating to the object manipulator is temporarily displayed.

45 Claims, 9 Drawing Sheets

FIG. 6

| Color | Name | Description |
|---|---|---|
| ■ | Object | Use to indicate that the value being edited by the grip will only affect the selected object. |
| □ | Object Light | Use for grips not in a horizontal plane, to help differentiate them from the usually more numerous horizontally oriented grips. |
| ■ | Object Dark | Also used for Free Form Mass Element Face grip, for faces pointing away from the viewport. |
| □ | Secondary Object | Use to identify a set of grips on one object that is related to another object being edited. For example, if the anchor of a door in a wall is being edited, the door's grips use the Object grip color, and the grips aligned with the wall use the Secondary Object grip color. |
| ■ | Style | Use to indicate that the value being edited by the grip is a style value, and will affect all objects with the same style as the selected object. |
| □ | Auxiliary | Use for miscellaneous grips that do not immediately change an object's properties.<br><br>Examples: changing edit state or changing the current shape being edited. |
| ■ | Auxiliary Dark | Use for Free Form Mass Element Edit Face grip, for faces pointing away from the viewport. |
| ■ | Hover | The color of a grip when the user has snapped to it, but hasn't selected it. Used to provide feedback to the user when there are many grips in a small area. |
| ■ | Selected | The color of a grip once it has been selected. |

TEMPORARY TEXT AND GRAPHIC FEEDBACK FOR OBJECT MANIPULATORS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

U.S. Provisional Patent Application Serial No. 60/408,710, entitled "DISPLAY AND USE OF OBJECT MANIPULATORS", by Scott Anthony Arvin, Marc W. Schindewolf, Rostislaw Starodub, Dianne Smith Phillips, Mandar Shashikant Garge, Paul Joseph McArdle, and John G. Ford III, filed on Sep. 6, 2002.

This application is related to the following co-pending and commonly-assigned patent application, which application is incorporated by reference herein:

U.S. patent application Ser. No. 10/657,422, entitled "OBJECT MANIPULATORS AND FUNCTIONALITY", by Scott Anthony Arvin, Marc W. Schindewolf, Rostislaw Starodub, Paul Joseph McArdle, and Mandar Shashikant Garge, filed on Sep. 8, 2003, now U.S. Pat. No. 7,110,005 issued on Sep. 19, 2006.

BACKGROUND OF THE INVENTION

1. Field of the Invention

The present invention relates generally to computer graphics programs, and in particular, to a method, apparatus, and article of manufacture for temporarily displaying text and graphic feedback for object manipulators in a computer graphics program.

2. Description of the Related Art

The use of graphics programs such as Computer Aided Design (CAD) application programs is well known in the art. CAD drawings often have many components (referred to as objects or graphics objects) that together define the drawing. In most computer applications that create and modify graphic objects, an object manipulator is a standard mechanism used to modify the geometric properties of the graphic object. However, the nature and use of prior art object manipulators fails to provide the ability to easily distinguish and identify the manipulator to be selected and the function to be performed by the manipulator. Further, the use of prior art object manipulators may be difficult and confusing. Such limitations are undesirable and reduce the flexibility and usability of computer graphics applications. These problems may be better understood by describing prior art drawing programs, object properties, object manipulators, and property modification techniques.

Drawing Programs

CAD applications are often used to create drawings used in the architectural, engineering, and construction (AEC) industry. The drawings are often defined by a collection of one or more graphical elements (referred to as objects), such as lines, circles, polylines, text, or dimensions. For example, a collection of various lines may make up a door or window object. CAD programs may treat each object as a single element for creation, manipulation, and modification. Some CAD programs may also provide objects that are special entities with predefined behaviors and display characteristics. Thus, the objects in a CAD program may be object-oriented objects having various methods/behaviors and properties (including display characteristics).

Information relating to an object may be entered and defined in one or more properties of the object. For example, users may have the capability to enter information about the style, dimensions, location, schedule data, display information and/or other important characteristics of an object.

Object Properties

To edit and maintain an object and/or properties of the object, various methodologies may be available. For example, a properties window may provide a common "one stop" location where a user can manage object properties without having to use individual typed commands. Such a properties window may list the current settings for all object properties, and allow the properties to be viewed alphabetically or by category. To change a property, the property may be selected from the list and a new value may be selected or entered.

Object Manipulators

An object manipulator is a prior art mechanism used to modify the geometric properties of a graphic object. Other names for object manipulators are handles, or grips. An object manipulator is typically implemented as a glyph or symbol, such as a small square, displayed at some geometrically meaningful point on the object to be manipulated.

FIG. 1 illustrates a prior art rectangle 100 that is selected for modification, with object manipulators 102 displayed as filled squares located at each vertex. Activating and dragging one of the object manipulators 102 modifies the position of the vertex, and thus the width and height properties of the rectangle.

The typical way to interact with an object manipulator 102 is to place an identifier (e.g., a cursor) controlled by a pointing device (e.g., a computer mouse) over the manipulator 102, activating the manipulator 102 by clicking a physical button on the pointing device, dragging the pointing device to change the position of the manipulator 102, and finally clicking the pointing device again to set the desired value of the object feature being manipulated. Thus, in the prior art, object manipulators 102 are often used to alter the geometric properties (e.g., vertex position, shape, etc.) of an object. However, to determine what and how the geometric property is to be altered, the user must experiment with the object manipulator or read the manual.

In view of the above, the prior art lacks the capability to easily determine what and how a geometric property will be altered by the use of an object manipulator.

SUMMARY OF THE INVENTION

A method, apparatus, and article of manufacture provide the ability to temporarily display text and/or graphics relating to one or more object manipulators. When a cursor is moved over an object manipulator (also referred to as a grip), information is temporarily displayed. Such displaying occurs without the user actually selecting the object manipulator.

Accordingly, based on the displayed information, the user has the ability to determine whether or not to activate/select the object manipulator. For example, when a cursor is placed over an object manipulator, the manipulator's color may change. Alternatively, graphics may illustrate the current value of an object's property or how activation of a particular modifier will affect the drawing or graphic object (i.e., that the object manipulator is associated with or placed on).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings in which like reference numbers represent corresponding parts throughout:

FIG. 6 illustrates the various colors (accompanied by names and descriptions) that may used to indicate different states and functionality for object manipulators in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
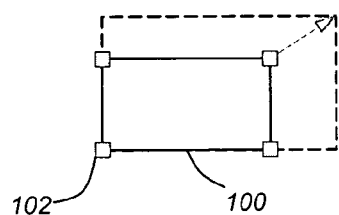
FIG. 1 illustrates a prior art rectangle that is selected for modification, with object manipulators displayed as filled squares located at each vertex.
Figure 2:
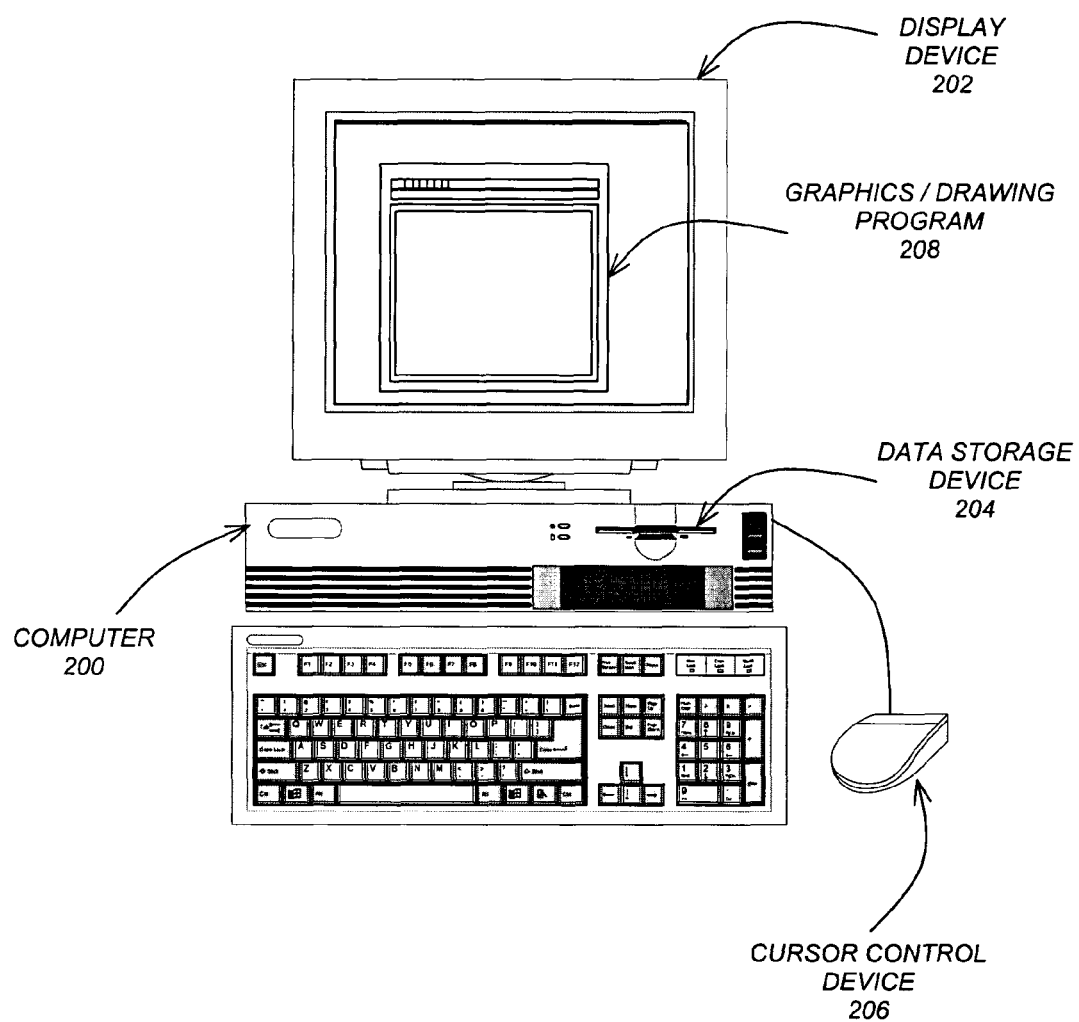
FIG. 2 is an exemplary hardware environment used to implement one or more embodiments of the invention.

FIG. 2 is an exemplary hardware environment used to implement one or more embodiments of the invention. Embodiments of the invention are typically implemented using a computer 200, which generally includes a display device 202, data storage devices 204, cursor control devices 206, and other devices. Those skilled in the art will recognize that any combination of the above components, or any number of different components, peripherals, and other devices, may be used with the computer 200.

One or more embodiments of the invention are implemented by a computer-implemented graphics program 208 (e.g., a computer-aided design [CAD] program), wherein the graphics program 208 is represented by a window displayed on the display device 202. Generally, the graphics program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Software Embodiments

Figure 3:
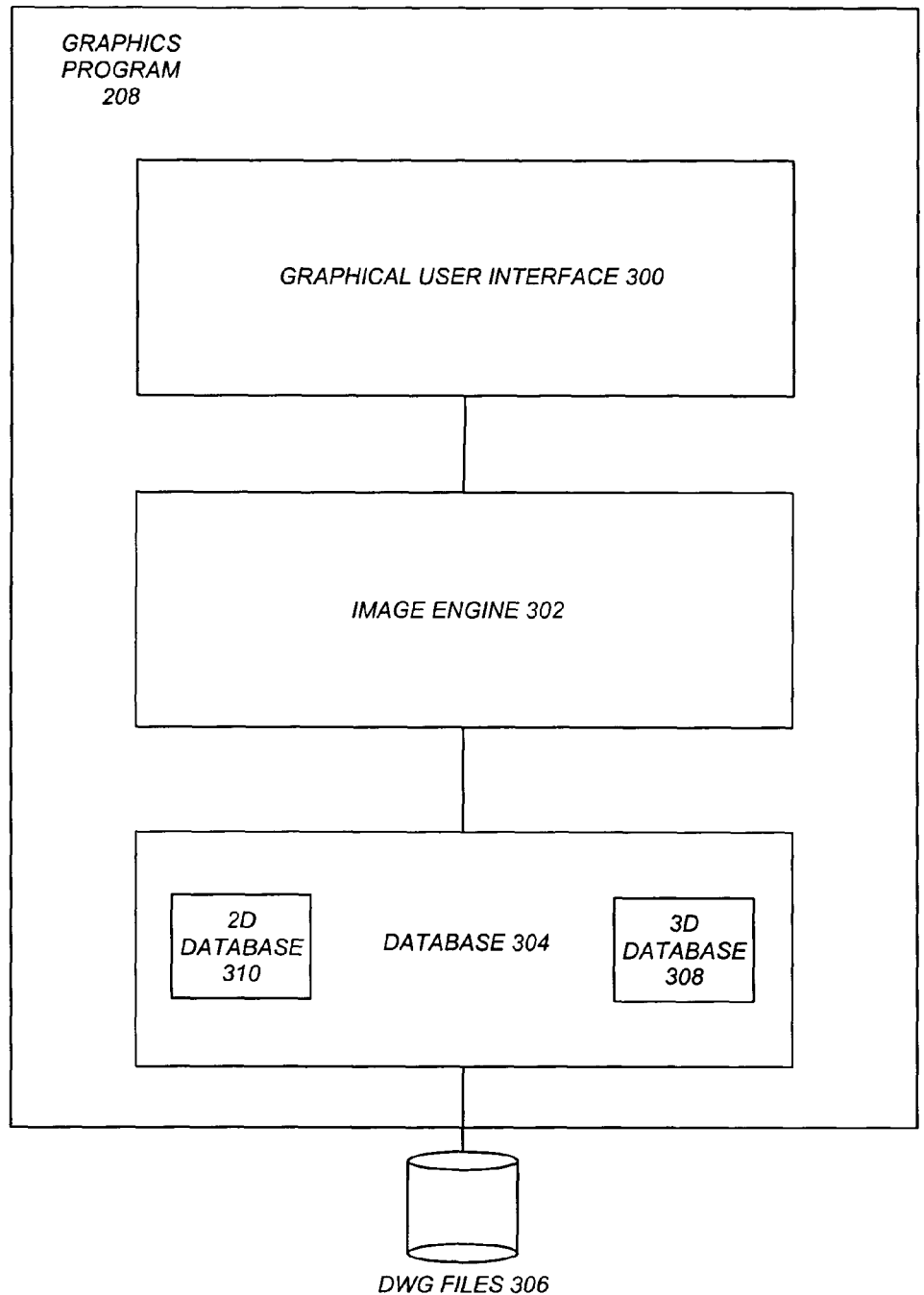
FIG. 3 is a block diagram that illustrates the components of a graphics program in accordance with one or more embodiments of the invention.

FIG. 3 is a block diagram that illustrates the components of the graphics program 208 in accordance with one or more embodiments of the invention. There are three main components to the graphics program 208, including: a Graphical User Interface (GUI) 300, an Image Engine (IME) 302, and a DataBase (DB) 304 for storing objects in Drawing (DWG) files 306.

The Graphical User Interface 300 displays information to the operator and provides the functionality for the operator's interaction with the graphics program 208.

The Image Engine 302 processes the DWG files 306 and delivers the resulting graphics to the monitor 202 for display. In one or more embodiments, the Image Engine 302 provides a complete application programming interface (API) that allows other computer programs to interface to the graphics program 208 as needed.

The Database 304 is comprised of two separate types of databases: (1) a 3D database 308 known as the "3D world space" that stores 3D information; and (2) one or more 2D databases 310 known as the "2D view ports" that stores 2D information derived from the 3D information.

Object List

Figure 4:
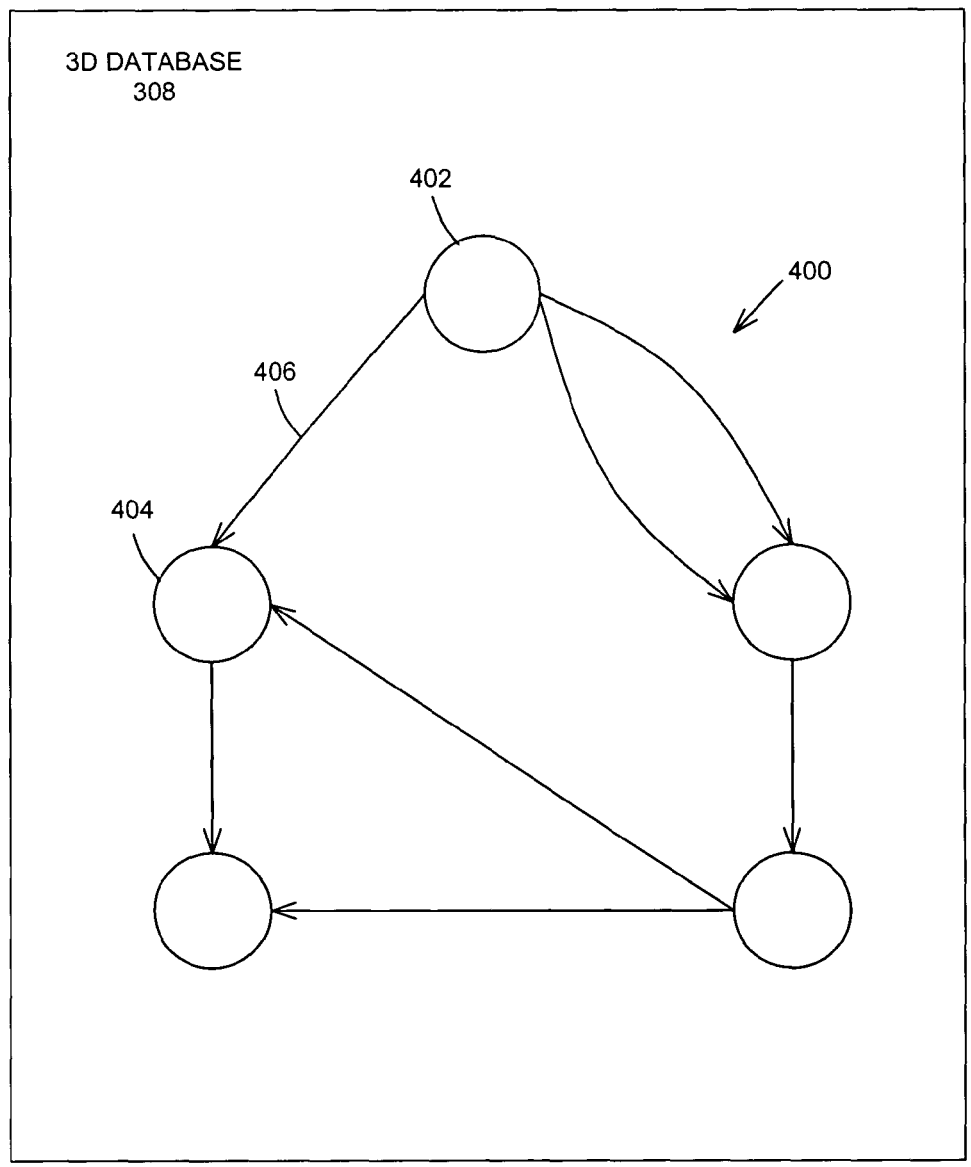
FIG. 4 is a block diagram that illustrates the structure of an object list maintained by a 3D database in accordance with one or more embodiments of the invention.

FIG. 4 is a block diagram that illustrates the structure of an object list 400 maintained by the 3D databases 308 in accordance with one or more embodiments of the invention. The object list 400 is usually comprised of a doubly-linked list having a list head 402 and one or more objects 404 interconnected by edges 406, although other structures may be used as well. There may be any number of different object lists 400 maintained by the 3D databases 308. Moreover, an object 404 may be a member of multiple object lists 400 in the 3D databases 308.

Terminology

As used herein, certain terms may be used frequently. The following provides definitions and descriptions for such terminology. However, the terminology definitions and descriptions provided herein are not intended to limit the scope of the invention and alternative meanings of such terms remain within the scope of the invention.

A "glyph" is a symbol that conveys information nonverbally. A glyph may have the following properties:

Shape—the polygonal shape of the glyph that is drawn.

Color—the color of the shape, both the glyph's outline color and its fill color.

Fill mode—whether or not the polygon is filled with a specified color.

Orientation—the rotational orientation of the glyph shape, generally whether or not the shape is transformed to align with the object being edited.

A "grip" is a glyph that has been positioned on an object and has an active area within which a pointing device will "snap" to the grip's position. The grip indicates that an action can be performed on the object, and defines the behavior of that action. A custom grip may have the following characteristics:

Glyph—the shape that is drawn.

Position—the position on the object where the glyph is located.

Size—the active area of the grip, usually defined in pixels, within which the pointing device will snap to the grip's position.

Parameter(s)—one or more parameters that can change while using the grip.

Behavior—what happens when the user selects the grip and drags the pointing device:

Geometric constraints—cursor position might be constrained along a specified set of points, a line such as a coordinate axis, or a plane.

Dimensional constraints—value being changed might be constrained to a user specified precision, or to a pre-specified list of acceptable values, such as a list of standard door sizes.

Dynamic dimensions—ability to display a temporary dimension when the grip is paused over or selected, and allows direct entry to change dimension value and update object.

Temporary location of the User Coordinate System (UCS), such as when constrained to a plane.

Key modifiers, such as Shift, Ctrl, or Alt key, to optionally change the behavior of a particular grip.

Cool grip—Grips are cool when displayed on an object that is not selected

Warm grip—A grip is warm when displayed on an object that is selected

Hot grip—A grip becomes hot when the grip is selected

The standard unconstrained grip that may appear on graphics objects may have a glyph shape that is identical to the grip area in plan view and the glyph scale may be equal to one (1).

Potential Selection Based Color Display of Object Manipulators

In prior art computer graphics applications object manipulators may be colored for a variety of reasons. For example, the color of a manipulator may be set to indicate something about the feature being manipulated (e.g. on a solid modeling object, vertex manipulators might be one color, while edge manipulators might be another color). Alternatively, the color of the manipulator may indicate the selection state of the object selected. For example, one object in a selection set containing multiple objects might be one color, while all of the other objects might be another color. Such a coloring of a single object in a set may indicate that the single object is considered the primary selection.

However, the prior art use of colors with object manipulators tends to be static in that the colors do not dynamically change merely as a cursor is moved. In addition, in situations where manipulators are displayed in close proximity to each other, it can often be difficult for the user to anticipate which manipulator will be activated as a result of activating a pointing/cursor control device (e.g., a computer mouse).

In one or more embodiments of the invention, the color of an object manipulator is changed when a user has positioned a cursor (e.g., controlled by a pointing/cursor control device such as a computer mouse) over a manipulator but has not yet selected the manipulator. Accordingly, feedback is provided to the user as to which manipulator will be activated if the user activates the pointing control device, thereby reducing errors and unintended results while using object manipulators.

Figure 5A:
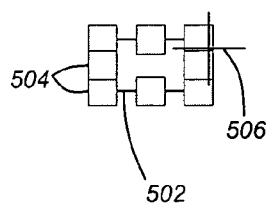
FIGS. 5A-5C illustrate the use of colored object manipulators to indicate potential user selections (also referred to as hover color) in accordance with one or more embodiments of the invention.
Figure 5B:
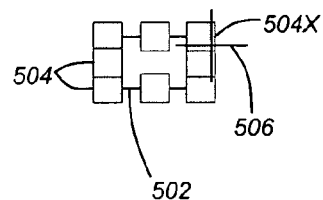
Figure 5C:
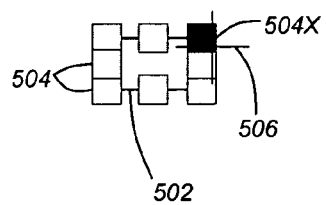

FIGS. 5A-5C illustrate the use of colored object manipulators to indicated potential user selections (also referred to as hover color). FIG. 5A shows a selected rectangle 502 with object manipulators 504 at each edge and each vertex. Since the manipulators 504 on the right edge overlap each other, it may be difficult for the user to determine which manipulator 504 will be activated if the user activates the pointing control device with the current pointer position 506 located as shown by the crosshairs. By temporarily changing the color of the manipulator 504X that would be activated if the user activated the pointing control device, as shown in FIG. 5B, the user is provided feedback that enables him or her to select the manipulator 504 they need. After the manipulator 504X is selected, the manipulator's 504X color again changes to a color that indicates the manipulator 504X is selected, as illustrated in FIG. 5C.

FIG. 6 illustrates the various colors (accompanied by names and descriptions) that may used to indicate different states and functionality for object manipulators 504. For example, the hover color to be used when a cursor 506 is over an object manipulator 508 may be green while the actual selected object manipulator 508 may be red.

Temporary Display of Dimensional Values Controlled by Object Manipulators

In the prior art, the dimensional properties of an object might be displayed when an object is selected, or when the manipulator controlling the value of the property is activated.

In accordance with one or more embodiments of the invention, the current value or values of the dimensional property to be modified by an object manipulator are temporarily displayed when a user has positioned a pointing device over a manipulator but has not yet selected the manipulator. The temporary dimensional values can be displayed immediately when the pointing device is positioned over the manipulator, or after a period of time has passed (e.g., a fraction of a second). Once displayed, the temporary dimensional values can be hidden after another period of time has passed. Alternatively, the temporary dimensional values may remain displayed until the user has either activated the manipulator or moved the position of the pointing device off of the manipulator.

By temporarily displaying the dimensional value, the user can use the manipulator to query the current state of the property the manipulator is used to edit, and then decide to activate the manipulator to change that property if the user determines that the current value is incorrect. This improves interaction by not requiring the user to use some other means to query the object's property, and by not requiring the user to activate the manipulator and accidentally changing a correct value.

Figure 7A:
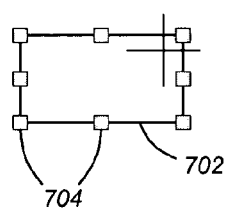
FIGS. 7A and 7B illustrate the temporary display of dimensional values controlled by object manipulators (also referred to as hover dimensions) in accordance with one or more embodiments of the invention.
Figure 7B:
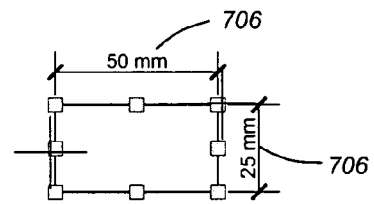

FIGS. 7A and 7B illustrate the temporary display of dimensional values controlled by object manipulators (also referred to as hover dimensions) in accordance with one or more embodiments of the invention. In FIG. 7A, a rectangle 702 is currently selected, with object manipulators 704 displayed at each vertex and edge that can be used to modify the rectangle's 702 width and height. The crosshairs indicate the current position of the pointing device. If the pointing device is moved to the position shown in FIG. 7B and left in that position for a short period of time, the current width and height of the rectangle are displayed with temporary dimensions 706.

Once the dimensions 706 are displayed, the user may decide whether or not to activate the object manipulator 704 under the pointing device position and modify the rectangle's 702 width and/or height. If the user elects not to activate the object manipulator 704 (e.g., by moving the position of the pointing device off of the object manipulator 704), the temporary dimensions are removed from the display, as again illustrated in FIG. 7A.

Dynamic Display of Dimensional Values Controlled by Object Manipulators

As described above, in the prior art, editing dimensions might be displayed on an object when the object itself is selected. However, when actually using the functionality of an individual object manipulator, such editing dimensions are not displayed.

In one or more embodiments of the invention, the current value or values of the dimensional property to be modified by an object manipulator are displayed when a user has activated a manipulator, and are dynamically updated while the user drags the pointing device.

Figure 8A:
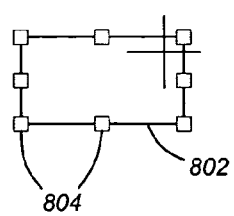
FIGS. 8A and 8B illustrate the dynamic display of dimensional values controlled by object manipulators (also referred to as hot dimensions) in accordance with one or more embodiments of the invention.
Figure 8B:
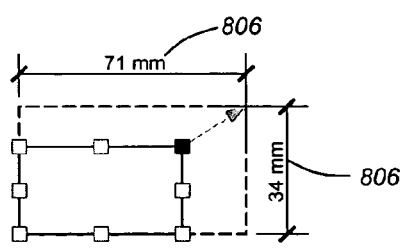

FIGS. 8A and 8B illustrate the dynamic display of dimensional values controlled by object manipulators (also referred to as hot dimensions). In FIG. 8A, a rectangle 802 is currently selected with object manipulators 804 displayed at each vertex that can be used to modify the rectangle's 802 width and height, with dimensional values not displayed.

FIG. 8B shows the same object 802 after the upper right vertex manipulator has been activated and dragged to the upper right. The height and width dimensions 806 reposition and update their values as the user drags the manipulator, providing feedback as to the current values of the properties being modified.

Displaying Existing, New, and Difference Values During Object Manipulation

In the prior art, it is often difficult to determine how activation of an object manipulator will affect the associated object. To facilitate such a determination, the invention may provide for the display of various dimensional values. Accordingly, when an object manipulator is used to modify the dimensional value of an object property, a set of three dimensions (also referred to as dimension trios) may be displayed when the manipulator has been activated.

Figure 9A:
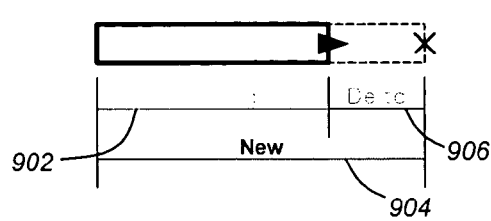
FIGS. 9A and 9B illustrate the display of existing, new, and difference values during object manipulation in accordance with one or more embodiments of the invention.
Figure 9B:
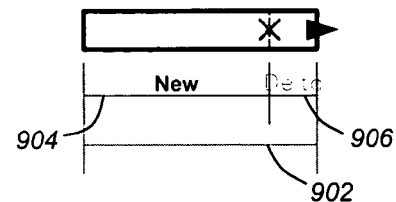

FIGS. 9A and 9B illustrate the display of existing, new, and difference values during object manipulation in accordance with one or more embodiments of the invention. As shown in FIGS. 9A and 9B, one dimension 902 shows the existing value of the property being modified, one dimension 904 shows the new value the property would have if a point is picked at the time, and a third dimension 906 shows the difference, or delta, between the first two dimensions 902 and 904. While the manipulator is being dragged, the existing dimension 902 is static while the new 904 and difference 906 dimensions update continuously with the movement of the pointing device. As shown, FIG. 9A illustrates when a drag operation increases the dimension of an object, while FIG. 9B illustrates when a drag operation decreases the dimension of an object.

Using Key Presses to Cycle Editable Dimensions

While the prior art may provide the ability to edit the properties of an object using an object manipulator (which thereby affect the object's dimensions), the prior art is limited and does not provide flexibility to the user during the editing process.

In one or more embodiments of the invention, when more than one editable dimension is displayed when an object manipulator is activated, the user can cycle through the list of editable dimensions by pressing an application specific key (e.g., the Tab key). Further, another key or key combination may provide the ability to cycle backward through the same list (e.g., Shift+Tab).

Thus, users can cycle through dynamic dimensions (change focus) by pressing the appropriate key. Pressing the appropriate key changes focus to the next dimension displayed, which may be visually indicated by coloring the text of the dimension with focus (e.g., to red). Users may then cycle until they reach a neutral state (e.g., no dimension has focus), then cycling starts over again. Another key (e.g., Shift+Tab) changes focus to the previous dimension. In addition, cycling through the dimensions may not display an edit box for the next dimension. Instead, such an operation may only shift the focus. Further, when in a neutral state, numeric entry may not activate a dimension, instead the numeric entry may be directed at the command prompt or other dimensional input method.

Figure 10A:
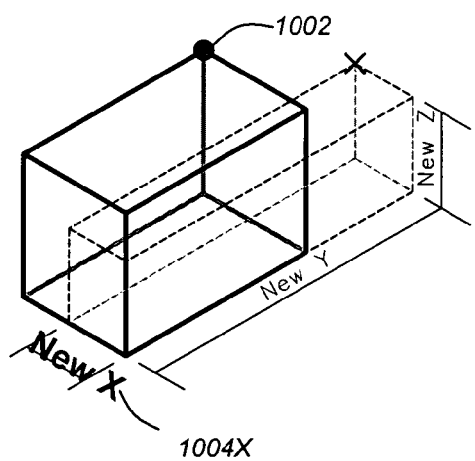
FIGS. 10A-10C illustrate how a user may cycle through the editable dimensions in accordance with one or more embodiments of the invention.
Figure 10B:
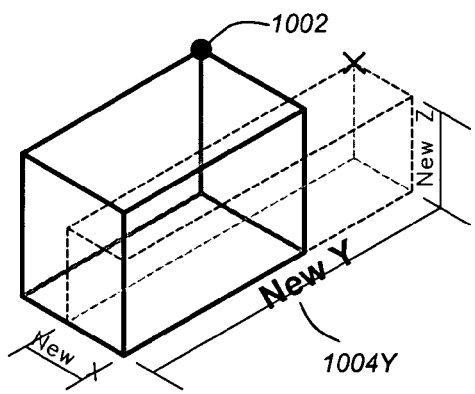
Figure 10C:
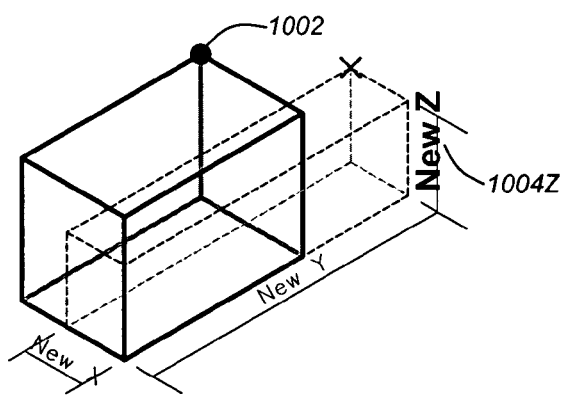

FIGS. 10A-10C illustrate how a user may cycle through the editable dimensions. A vertex manipulator 1002 is used to modify the width, depth, and height of a box. When the manipulator is activated, editable dimensions 1004X, 1004Y and 1004Z are displayed for each of the three values, with the dimension that is currently editable displayed with larger bold text (e.g., 1004X in FIG. 10A, 1004Y in FIG. 10B, and 1004Z in FIG. 10C).

Table A lists some examples of keys and their associated functions during cycling when dimensions are displayed while creating or grip-editing an object:

TABLE A

| Key | Description |
| --- | --- |
| Tab | Changes focus to the next dimension or neutral state |
| Shift + Tab | Changes focus to the previous dimension or neutral state |

In addition to the above, different coloring may be used to differentiate the various displayed dimensions. For example, a dynamic dimension that is editable and currently has the focus may be drawn in a particular color with a bold text style. A dynamic dimension that is editable but does not have the current focus may be drawn in a particular color with a simple, non-bold text style. Further, a dynamic dimension that cannot be edited may be drawn with a dimmed color (e.g. gray) with a simple, non-bold text style.

Temporary Graphic Feedback of the Potential Results of Object Manipulator Activation As described above, in the prior art, it is often difficult to determine how activation of an object manipulator will affect a particular associated object. To facilitate such a determination, one or more embodiments of the invention may display graphics that indicate the potential change to an object's state when a user has positioned a pointing device over a manipulator but has not yet selected the manipulator.

Such feedback communicates to the user the potential results of interacting with an object manipulator without requiring the user to: (a) interact with the manipulator; (b) experiment with what can be done with the manipulator; and/or (c) potentially undo unintended results.

For example, a graphics application might have a rectangle with possible horizontal alignment values of Left, Center, and Right, and possible vertical alignment values of Top, Middle, and Bottom, and the rectangle might be drawn using those alignment properties relative to its specified location. The rectangle could be drawn in different positions by changing its alignment but not its location.

Figure 11A:
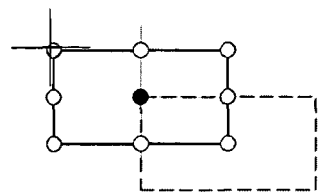
FIGS. 11A and 11B illustrate the use of temporary graphic feedback and potential results (also referred to as hover graphics) in accordance with one or more embodiments of the invention.
Figure 11B:
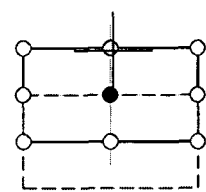

FIGS. 11A and 11B illustrate the use of temporary graphic feedback and potential results (also referred to as hover graphics). FIG. 11A illustrates a rectangle with a Middle Center alignment, and the rectangle's location indicated with horizontal and vertical lines. If the user positions the pointing device over the top left object manipulator, which is used to set the rectangle's alignment accordingly, a dashed rectangle may be displayed in the position that would result from making this modification. FIG. 11B shows a similar display if the user positions the pointing device over the top middle object manipulator. Accordingly, this method provides graphic feedback to the user as to the potential results of making a particular modification, allowing the user to visualize those results before making the modification.

In view of the above, the temporary graphics are displayed when a user has positioned a pointing device over a manipulator but has not yet selected the manipulator. The temporary graphics can be displayed immediately when the pointing device is positioned over the manipulator, or after a period of time has passed (e.g., a fraction of a second). Once displayed, the temporary graphics can be hidden after another period of time has passed, or can remain displayed until the user has either activated the manipulator or moved the position of the pointing device off of the manipulator.

Temporary Text Feedback of Object Manipulator Function

In the prior art, users may learn the intended use of an object manipulator by its shape, position, through experimentation, or by reading the documentation. However, the prior art fails to provide the ability to easily determine how an object manipulator may be used without such activities.

In one or more embodiments of the invention, the function of an object manipulator, i.e. the name of property it is used to modify, is temporarily displayed in a text message box near the manipulator when a user has positioned a pointing device over a manipulator but has not yet activated it. In addition, the text message box may also display additional information about the manipulator's functionality (e.g., a legend describing the meaning of different colors displayed on/near the object and/or object manipulator).

This method communicates to the user the variety of actions possible with object manipulators without requiring the user to read the user documentation or experiment with the manipulators, thereby allowing the user to select the correct manipulator to modify the property they intend, and avoiding mistakes in selecting manipulators that modify other properties and requiring users to undo mistakes and try again.

Figure 12A:
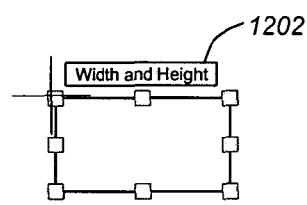
FIGS. 12A-12B illustrate the use of temporary text feedback (also referred to as grip tips) in accordance with one or more embodiments of the invention.
Figure 12B:
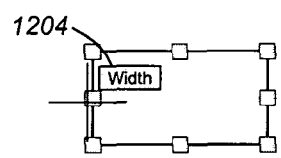

FIGS. 12A-12B illustrate the use of temporary text feedback (also referred to as grip tips) in accordance with one or more embodiments of the invention. FIG. 12A shows a selected rectangle with object manipulators displayed at each vertex used to modify both width and height, and at each edge used to modify only the width or the height, as appropriate. If the user positions a pointing device over the top left vertex manipulator, a text message box 1202 is displayed indicating that manipulator can be used to modify the width and the height. Similarly, if the user positions a pointing device over the middle left edge manipulator (as in FIG. 12B), a text message box 1204 is displayed indicating the manipulator can be used to modify the width.

The text message box is displayed when a user has positioned a pointing device over a manipulator but has not yet selected it. Further, the message box can be displayed immediately when the pointing device is positioned over the manipulator, or after a period of time has passed (e.g., a fraction of a second). Once displayed, the message box can be hidden after another period of time has passed, or can remain displayed until the user has either activated the manipulator or moved the position of the pointing device off of the manipulator.

Temporary Text Feedback of Object Manipulator Function Modifiers

In addition to displaying the name of the property associated with the object manipulator (as described above), one or more embodiments of the invention may display the methods used to modify/adjust a function associated with the object manipulator. In this regard, such methods/capabilities are displayed along with the temporary text feedback that describes the base function of the manipulator.

Figure 13:
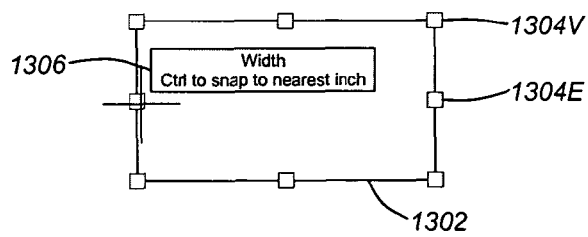
FIG. 13 illustrates the display of an object manipulator function modifier in accordance with one or more embodiments of the invention.

FIG. 13 illustrates the display of an object manipulator function modifier in accordance with one or more embodiments of the invention. FIG. 13 shows a selected rectangle 1302 with object manipulators displayed at each vertex 1304V used to modify both width and height and at each edge 1304E used to modify only the width or the height, as appropriate. If the user positions the pointing device over an edge manipulator 1304E, temporary text feedback 1306 may be displayed indicating that the manipulator 1304E can be used to modify the width. The second line of the text indicates that if the user presses the Ctrl key while using this manipulator, the width of the rectangle will be modified to the nearest inch.

Thus, as described, text within the message box may describe how the function of the object manipulator may be modified to perform a more specific or different function (e.g., to snap to the nearest inch, the Ctrl key may be depressed).

Temporary Text Feedback of Object Manipulator Value

Similar to the above described temporary text (i.e., for the object property and object manipulator modifier), one or more embodiments of the invention may display additional information about the manipulator's functionality. For example, the current value of the property an object manipulator may be used to modify may be displayed. In this regard, the temporary text may act as a legend describing the manipulator's functionality, how to perform the function, and/or a description of the displayed contents on the screen.

Figure 14:
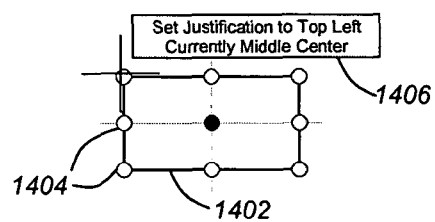
FIG. 14 illustrates the temporary text feedback of an object manipulator value in accordance with one or more embodiments of the invention.

FIG. 14 illustrates the temporary text feedback of an object manipulator value in accordance with one or more embodiments of the invention. A selected rectangle 1402 is shown with object manipulators 1404 used to set the justification of the rectangle 1402. If the user positions the pointing device over the top left manipulator 1404, temporary text feedback 1406 is displayed indicating that activating the manipulator 1404 will change/set the justification, and that the current justification is Middle Center.

In another example, if a door is displayed, the temporary text for an object manipulator may display "Set width to standard size; Long gray marks—Current height standard; Short red marks—Current height is non-standard". In such an example, the object manipulator may be used to set the width of the door to a standard size. The text provides information regarding the value of the door's current properties, and/or options or functions to change that value.

Logical Flow

Figure 15:
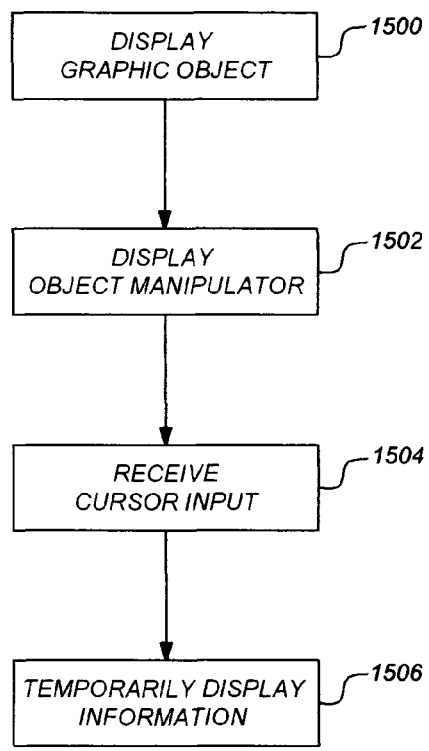
FIG. 15 is a flow chart illustrating the logical flow for displaying temporary information relating to an object manipulator in accordance with one or more embodiments of the invention.

FIG. 15 is a flow chart illustrating the logical flow for displaying temporary information relating to an object manipulator in accordance with one or more embodiments of the invention. At step 1500, a graphic object is displayed in a computer graphics program.

At step 1502, an object manipulator is displayed on the graphics object. At step 1504, cursor input is received. Such cursor input provides for placing the cursor over the object manipulator.

At step 1506, information relating to the object manipulator is temporarily displayed. As described above, the information may be displayed without activating the object manipulator. Further, the information may consist of a variety of different types and formats. For example, the information could be a change in a color of the object manipulator or the object manipulator may flash in different colors. Alternatively, the information could be a value of a property (e.g., a dimensional property) to be modified by the object manipulator. The information could also be graphics that indicate a potential change to a state of the graphic object (e.g., potential results of interacting with the object manipulator). Further, the information could be a function of the object manipulator, a name of a property the object manipulator is used to modify, and/or a method used to modify a function of the object manipulator.

In addition to the above, the information may be displayed in a text message box. As described above, the information is temporarily displayed. In this regard, the information may be displayed immediately when the cursor is placed/located over the object manipulator. Alternatively, the information may be displayed after a period of time has passed with the cursor located over the object manipulator. Once displayed, the information may be hidden from display after another period of time has passed. Alternatively, the information may remain displayed until a user activates the object manipulator or the cursor is moved off of the object manipulator.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for temporarily displaying information relating to an object manipulator:
   displaying a graphic object in a computer graphics program;
   displaying an object manipulator on the graphic object, wherein the object manipulator comprises a glyph or symbol that is used to modify a property of the graphic object;
   receiving cursor input wherein a cursor is placed over the object manipulator; and
   temporarily displaying information relating to the object manipulator without activating the object manipulator.

2. The method of claim 1, wherein temporarily displaying the information comprises changing a color of the object manipulator, wherein other object manipulators are displayed in close proximity on the graphic object such that it is difficult to distinguish which object manipulator will be activated as a result of pointing device activation, and wherein the changing of the color distinguishes the object manipulator from the other object manipulators.

3. The method of claim 1, wherein the information comprises a value of the property that will be modified by activation of the object manipulator.

4. The method of claim 3, wherein the property comprises a dimensional property.

5. The method of claim 1, wherein the information comprises a graphics visual representation of the graphic object indicating a potential change to a state of the graphic object.

6. The method of claim 5, wherein the potential change comprises potential results of interacting with the object manipulator.

7. The method of claim 1, wherein the information comprises a function of the object manipulator.

8. The method of claim 7, wherein the function comprises a name of the property the object manipulator is used to modify.

9. The method of claim 1, wherein the information is displayed in a text message box.

10. The method of claim 1, wherein the information comprises a method used to modify a function of the object manipulator.

11. The method of claim 1, wherein the information is displayed immediately when the cursor is located over the object manipulator.

12. The method of claim 1, wherein the information is displayed after a period of time has passed with the cursor located over the object manipulator.

13. The method of claim 1, wherein the information is hidden from display after a period of time has passed.

14. The method of claim 1, wherein the information remains displayed until a user activates the object manipulator.

15. The method of claim 1, wherein the information remains displayed until the cursor is moved off of the object manipulator.

16. An apparatus for temporarily displaying information relating to an object manipulator in a computer graphics program of a computer system comprising:
   (a) a computer having a memory;
   (b) an application executing on the computer, wherein the application is configured to:
      (i) display a graphic object in a computer graphics program;
      (ii) display an object manipulator on the graphic object, wherein the object manipulator comprises a glyph or symbol that is used to modify a property of the graphic object;
      (iii) receive cursor input wherein a cursor is placed over the object manipulator; and
      (iv) temporarily display information relating to the object manipulator without activating the object manipulator.

17. The apparatus of claim 16, wherein the application is configured to temporarily display the information by changing a color of the object manipulator, wherein other object manipulators are displayed in close proximity on the graphic object such that it is difficult to distinguish which object manipulator will be activated as a result of pointing device activation, and wherein the changing of the color distinguishes the object manipulator from the other object manipulators.

18. The apparatus of claim 16, wherein the information comprises a value of the property that will be modified by activation of the object manipulator.

19. The apparatus of claim 18, wherein the property comprises a dimensional property.

20. The apparatus of claim 16, wherein the information comprises a graphics visual representation of the graphic object indicating a potential change to a state of the graphic object.

21. The apparatus of claim 20, wherein the potential change comprises potential results of interacting with the object manipulator.

22. The apparatus of claim 16, wherein the information comprises a function of the object manipulator.

23. The apparatus of claim 22, wherein the function comprises a name of the property the object manipulator is used to modify.

24. The apparatus of claim 16, wherein the information is displayed in a text message box.

25. The apparatus of claim 16, wherein the information comprises a method used to modify a function of the object manipulator.

26. The apparatus of claim 16, wherein the information is displayed immediately when the cursor is located over the object manipulator.

27. The apparatus of claim 16, wherein the information is displayed after a period of time has passed with the cursor located over the object manipulator.

28. The apparatus of claim 16, wherein the information is hidden from display after a period of time has passed.

29. The apparatus of claim 16, wherein the information remains displayed until a user activates the object manipulator.

30. The apparatus of claim 16, wherein the information remains displayed until the cursor is moved off of the object manipulator.

31. An article of manufacture comprising a program storage medium readable by a computer and embodying one or more instructions executable by the computer to perform a method for temporarily displaying information relating to an object manipulator in an object-oriented computer graphics system, the method comprising:

means for displaying a graphic object in a computer graphics program;
   means for displaying an object manipulator on the graphic object, wherein the object manipulator comprises a glyph or symbol that is used to modify a property of the graphic object;
   means for receiving cursor input wherein a cursor is placed over the object manipulator; and
   means for temporarily displaying information relating to the object manipulator without activating the object manipulator.

32. The article of manufacture of claim 31, wherein the means for temporarily displaying the information comprises means for changing a color of the object manipulator, wherein other object manipulators are displayed in close proximity on the graphic object such that it is difficult to distinguish which object manipulator will be activated as a result of pointing device activation, and wherein the changing of the color distinguishes the object manipulator from the other object manipulators.

33. The article of manufacture of claim 31, wherein the information comprises a value of the property that will be modified by activation of the object manipulator.

34. The article of manufacture of claim 33, wherein the property comprises a dimensional property.

35. The article of manufacture of claim 31, wherein the information comprises a graphics visual representation of the graphic object indicating a potential change to a state of the graphic object.

36. The article of manufacture of claim 35, wherein the potential change comprises potential results of interacting with the object manipulator.

37. The article of manufacture of claim 31, wherein the information comprises a function of the object manipulator.

38. The article of manufacture of claim 37, wherein the function comprises a name of the property the object manipulator is used to modify.

39. The article of manufacture of claim 31, wherein the information is displayed in a text message box.

40. The article of manufacture of claim 31, wherein the information comprises a method used to modify a function of the object manipulator.

41. The article of manufacture of claim 31, wherein the information is displayed immediately when the cursor is located over the object manipulator.

42. The article of manufacture of claim 31, wherein the information is displayed after a period of time has passed with the cursor located over the object manipulator.

43. The article of manufacture of claim 31, wherein the information is hidden from display after a period of time has passed.

44. The article of manufacture of claim 31, wherein the information remains displayed until a user activates the object manipulator.

45. The article of manufacture of claim 31, wherein the information remains displayed until the cursor is moved off of the object manipulator.

* * * * *